UNITED STATES PATENT OFFICE.

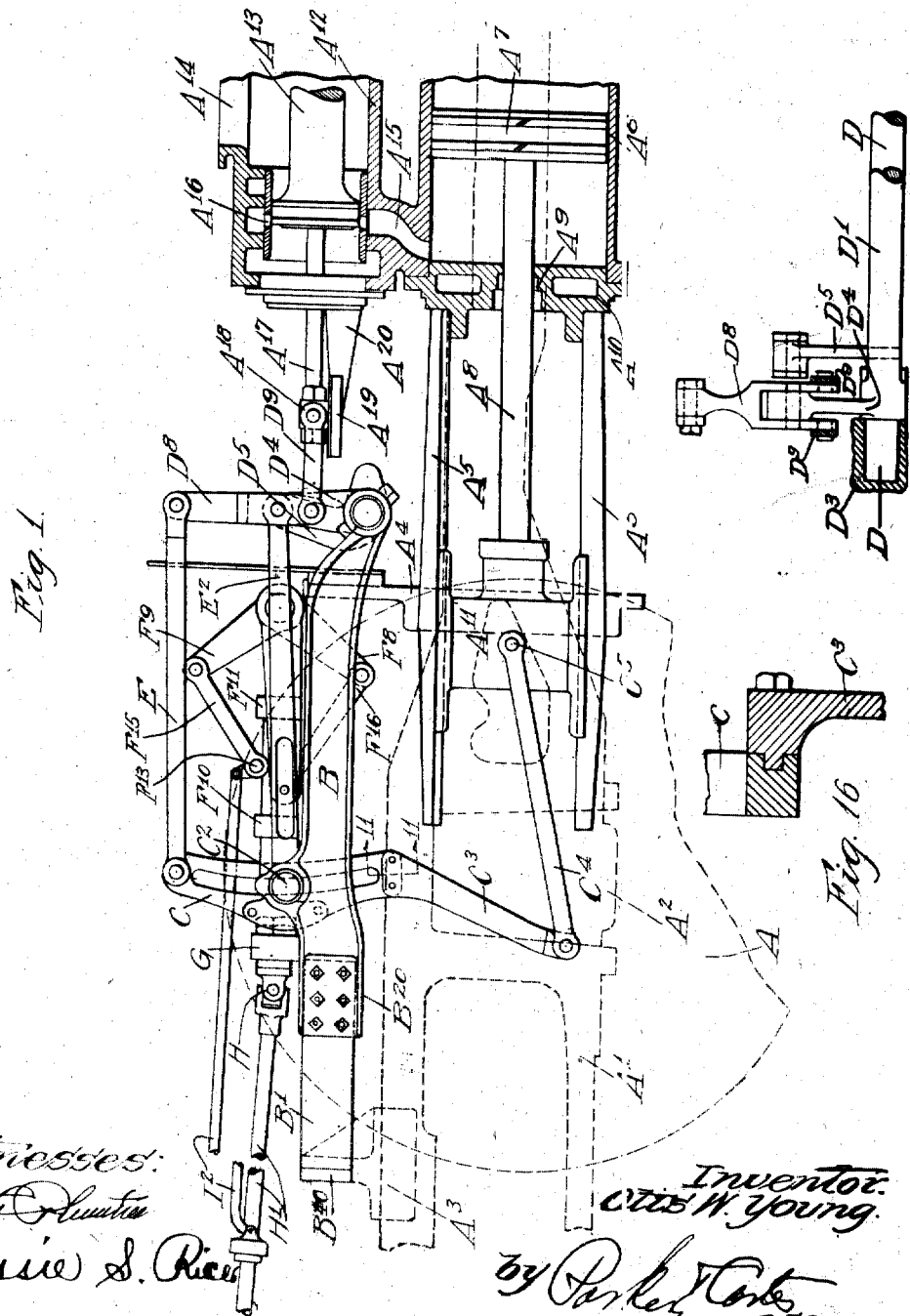

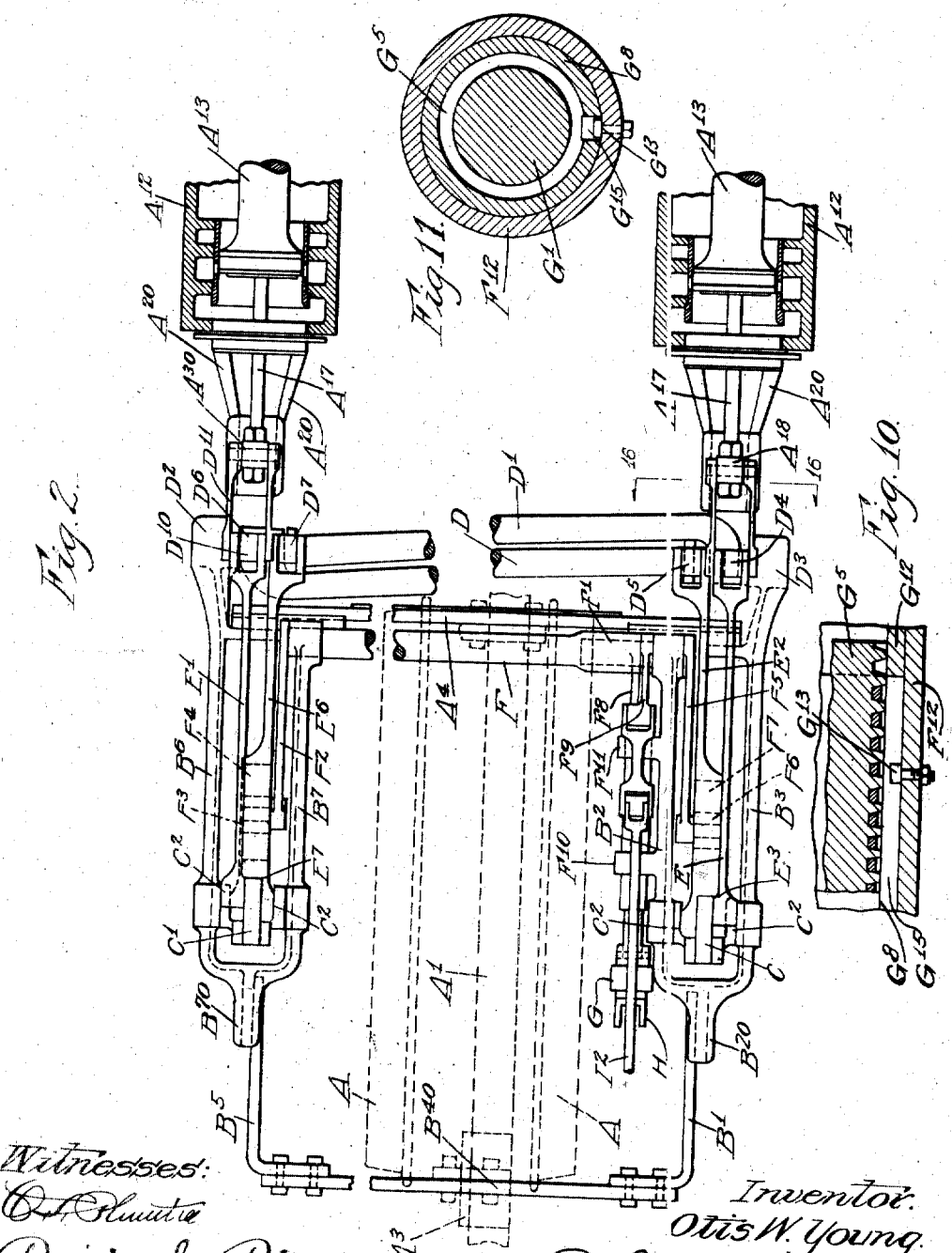

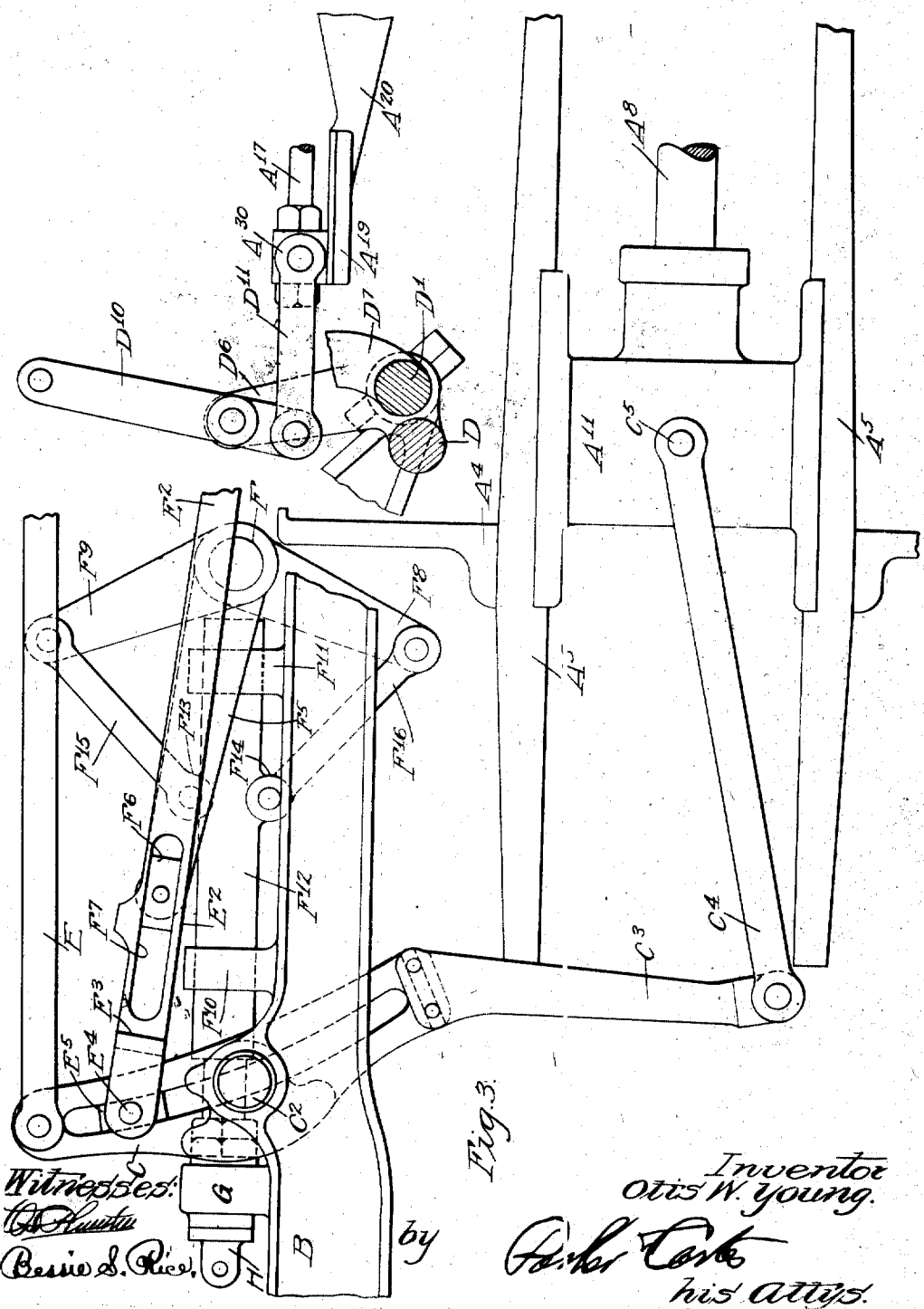

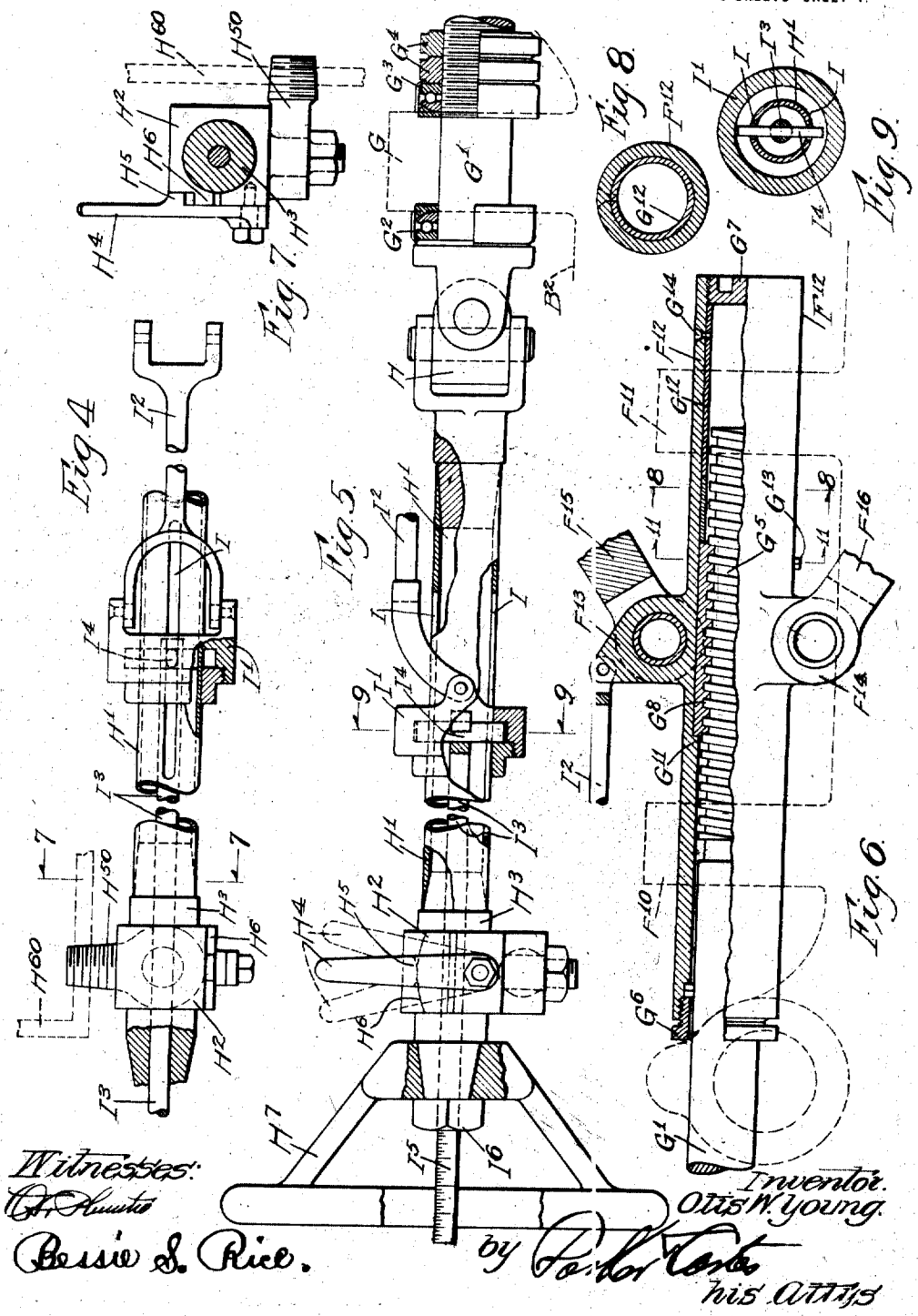

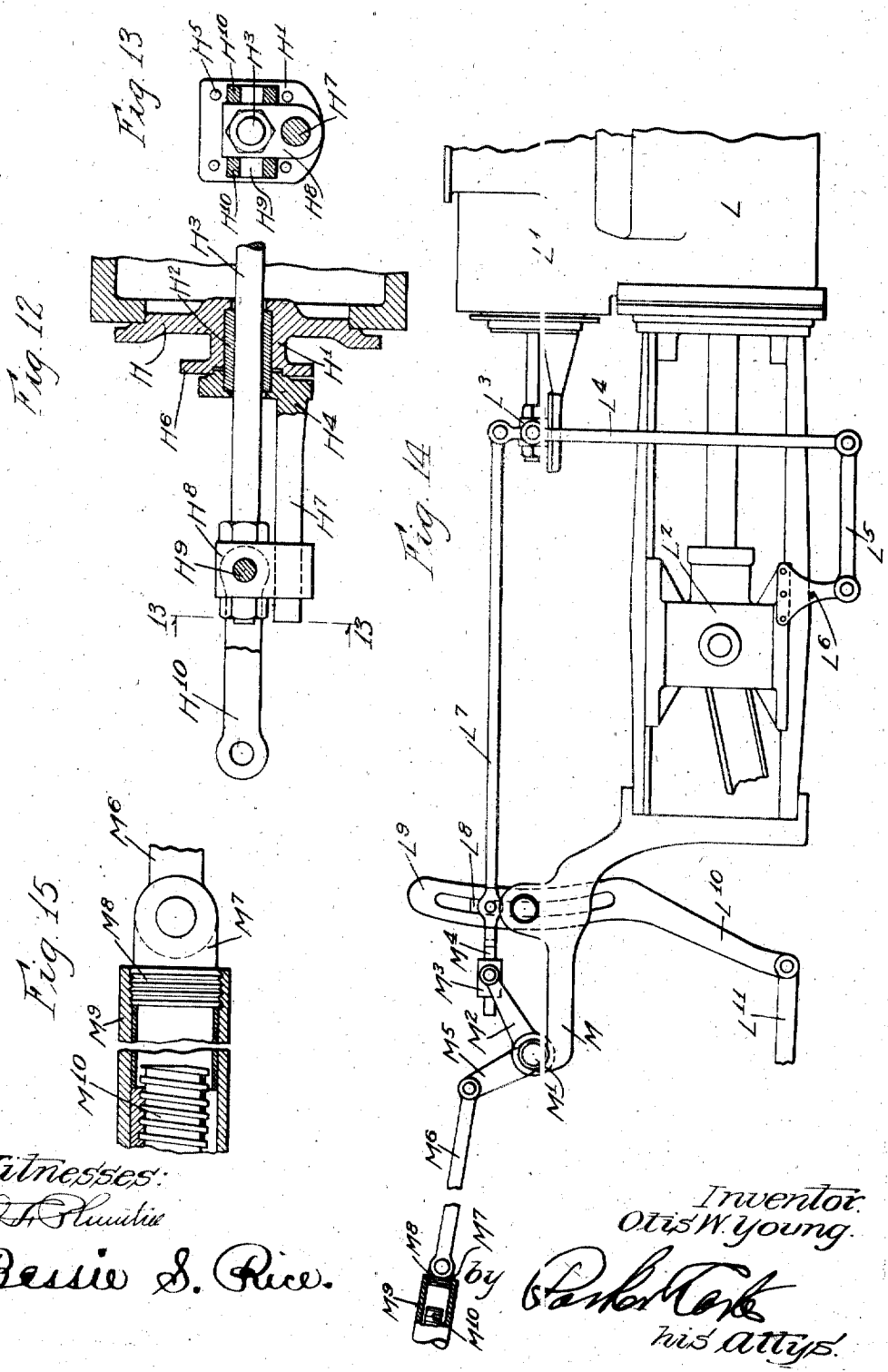

OTIS W. YOUNG, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

LOCOMOTIVE VALVE-GEAR.

1,221,947.   Specification of Letters Patent.   Patented Apr. 10, 1917.

Application filed October 2, 1914. Serial No. 864,552.

*To all whom it may concern:*

Be it known that I, OTIS W. YOUNG, a citizen of the United States, residing at Chicago, in the county of Cook and State of Illinois, have invented a certain new and useful Improvement in Locomotive Valve-Gears, of which the following is a specification.

My invention relates primarily to valve and reversing gears for steam engines and has particular reference to a gear for use with the well-known type of railroad locomotive which is driven by two steam engines one on either side of the main frame and it has for some of its objects to provide means for making the piston of one engine provide the lap and lead movement for itself and the valve travel for the other engine and vice versa and has for other objects to provide a light and durable mechanism, one in which very long valve travel without undue angularity can be had and in which a minimum number of changeable or other variable parts appear. Still other objects will appear as the description proceeds.

It is illustrated more or less diagrammatically in the accompanying drawings, wherein—

Figure 1 is a side elevation of one of the engines of the locomotive in part section and with parts removed;

Fig. 2 is a plan view of the valve gear with the valves of the two engines of the locomotive in part section and with parts cut away;

Fig. 3 is a side elevation on an enlarged scale of the valve gear in a different position from Fig. 1, the parts shown in the upper right-hand corner separate being the corresponding parts on the far side, the remainder of the view showing the parts on the near side to indicate the relative position of the parts on the far side which are operated by the parts on the near side;

Fig. 4 is a diagrammatic plan view in part section with parts broken away and parts omitted of the reversing gear and connections;

Fig. 5 is a side elevation in part section and with parts removed of the reversing gear;

Fig. 6 is a side elevation in part section of a reversing screw and sleeve;

Fig. 7 is a section on the line 7—7 of Fig. 4;

Fig. 8 is a section on the line 8—8 of Fig. 6;

Fig. 9 is a section on the line 9—9 of Fig. 5;

Fig. 10 is a detail section of part of the reversing screw and nut;

Fig. 11 is a section on line 11—11 of Fig. 6;

Fig. 12 is a section through the end of the valve housing showing a modified form of valve stem cross head guide;

Fig. 13 is a section on line 13—13 of Fig. 12;

Fig. 14 is a diagrammatic detail showing my reversing gear applied to the ordinary type of Walschaert valve gear;

Fig. 15 is a detail part section on an enlarged scale showing a portion of the reversing gear shown in Fig. 14.

Fig. 16 is a fragmental section on line 16—16 of Fig. 2.

Like parts are indicated by like letters throughout the several figures.

Since my invention is primarily applicable to a locomotive, I have illustrated it diagrammatically as so applied and have shown in Fig. 1 enough of the locomotive frame and supporting mechanism to indicate generally the location of my valve gear and its relation to the locomotive parts of the ordinary type.

A is a locomotive driver and there may be only one or there may be a number of them. A¹ is the usual type of locomotive frame. A² is the journal block which contains the drive wheel axle and is mounted in the frame. A³ is a saddle on the locomotive frame fixed in position upon each individual locomotive but likely to be found in different positions in different types and designs of locomotives. A⁴ is a hanger or cross frame extending across between the two side frames of the locomotive to tie them together and also to provide a support for the cross head guide A⁵. A⁶ is an engine cylinder supported on the engine frame in any suitable manner not here specifically indicated. In it reciprocates the piston A⁷ having the piston rod A⁸ which passes through the usual type of stuffing box A⁹ in the cylinder head A¹⁰ and drives a cross head $A^{11}$ which reciprocates on the cross head guide $A^5$. $A^{12}$ is a steam chest containing an inside admission piston valve $A^{13}$ which controls the usual steam ports and passages as indicated. $A^{17}$ is a valve rod and $A^{18}$ a valve rod cross head slidable along a cross head guide $A^{19}$. This guide is mounted on an arm $A^{20}$ projecting from the cover of the steam chest $A^{12}$.

B is a frame or support for the movable members of the valve gear mechanism mounted at its forward end on the cross frame $A^4$ and supported at its rear end by the extension L-piece $B^1$ which rests upon the saddle $A^3$. The frame, it will be noted, is substantially U-shaped being made up of two substantially parallel side members $B^2$, $B^3$ tied together at the rear end to form a U and having an extension $B^{20}$ to which is attached the L member $B^1$. On the left-hand side of the locomotive frame is a similar support for the valve gear movable members made up of side pieces $B^6$, $B^7$ tied together at their rear end and provided with the rearward extension $B^{70}$ connected to the L pieces $B^5$ which also rests upon the saddle $A^3$ on the locomotive frame. $B^{40}$ is a tie rod extending across the locomotive frame tying the two L pieces $B^1$, $B^5$ together to hold the two separate valve gear frames or supports in parallelism.

C, $C^1$ are combined lap and lead lever segmental slotted reversing and cut-off varying links having trunnions $C^2$ and rotatably mounted one in each of the valve gear frames adjacent the rear ends thereof. These reversing links are each of them provided with a downwardly depending extension $C^3$ which extension while not integral with the link is after assembly rigidly mounted thereon. $C^4$, $C^4$ are floating links pivoted at one end to the extension on the reversing link and at the other end to the cross head pin $C^5$ so that as the piston of each engine travels back and forth the reversing link will be rocked in unison with said movement It will, of course, be possible to attach the floating link to the cross head by any other suitable means but for the sake of simplicity and convenience, I prefer to pivot it upon the cross head wrist pin.

D, $D^1$ are two exactly similar and identical interlocking cross shafts. Shaft $D^1$ is rotatably mounted in a bearing $D^2$ at the forward end of the member $B^6$ and the shaft D is rotatably mounted in a bearing $D^3$ at the forward end of the member $B^3$. The shaft D is also rotatably mounted at its other end upon a shaft $D^1$ adjacent the bearing $D^2$ and the shaft $D^1$ is rotatably mounted at its other end on the shaft D adjacent the bearing $D^3$. $D^4$ is a lever mounted upon the right-hand end of the shaft $D^1$, and $D^5$ is a lever mounted on the right hand end of the shaft D. $D^6$ is a lever mounted on the left hand end of the shaft D and $D^7$ is a lever mounted on the left hand end of the shaft $D^1$. $D^8$ is a floating lap and lead lever mounted pivotally upon the lever $D^4$ connected at its lower end by means of the link $D^9$ with the valve stem cross head $A^{18}$. $D^{10}$ is a floating lap and lead lever pivotally mounted on the lever $D^6$ connected at its lower end pivotally by means of the link $D^{11}$ with a similar valve stem cross head $A^{30}$.

E is a reach rod connecting the upper ends respectively of the reversing link C, and the lap and lead lever $D^8$. $E^1$ is a similar reach rod connecting the upper ends of the reversing link $C^1$ and the lap and lead lever $D^{10}$ so that a rocking of the reversing link will result in a rocking of the lap and lead lever. Pivotally mounted on the lever $D^5$ is a radius bar $E^2$. This radius bar is forked at its rear end as indicated at $E^3$ to furnish a bearing for the pins $E^4$ which project outwardly on either side from the link block $E^5$ which block is slidable in the reversing link. A similar construction appears on the left hand side of the engine wherein a radius bar $E^6$ is pivoted on the arm $D^7$ forked at $E^7$ and pivoted to a similar sliding link block in the reversing link $C^1$.

F is a reversing shaft rotatably mounted at one end in the member $B^7$ and rotatably mounted at the other end on a stub reverse shaft $F^1$ which stub its itself rotatable in the member $B^2$. $F^2$ is a reversing arm rigidly mounted on the left hand end of the reverse shaft F pivotally engaging the block $F^3$ which block is slidable in the slot $F^4$ in the radius bar $E^6$. $F^5$ is an arm rigidly mounted on the stub reverse shaft $F^1$ pivotally engaging a block $F^6$ which block is slidably mounted in the slot $F^7$ in the radius bar $E^2$. $F^8$ is a short reverse arm mounted on the shaft F at approximately 45° below the plane of the arms $F^2$ and $F^5$. $F^9$ is a short reverse arm mounted on the shaft $F^1$ at approximately 45° above the plane of the arms $F^5$ and $F^2$. $F^{10}$, $F^{11}$ are bearing brackets mounted on the member $B^2$. Slidable in them is a reversing sleeve. $F^{12}$ provided above and below with bosses $F^{13}$, $F^{14}$ upon which are pivoted connecting links $F^{15}$, $F^{16}$ pivoted at their other ends respectively on the arms $F^9$, $F^8$ so that a longitudinal movement of the sleeve $F^{12}$ will result in rocking the arms $F^8$, $F^9$ toward or from each other as the case may be and similarly rocking the arms $F^5$, $F^6$.

G is a bracket mounted on the member $B^2$ behind and removed from the bracket $F^{10}$. Through it passes the screw stem $G^1$. On either side of it are ball bearings $G^2$, $G^3$ held in position upon the stem $G^1$ by lock nuts $G^4$. The stem $G^1$ terminates in a screw $G^5$ located within the sleeve $F^{12}$. $G^6$ is a packing box at one end of the sleeve $F^{12}$. $G^7$ is an oil tight plug at the other end. $G^8$ is a cylindrical reversing nut mounted in the sleeve $F^{12}$ and held against the shoulder $G^{11}$ by a sleeve $G^{12}$ forced into position by the plug $G^7$. This nut is held against rotation by a lock nut $G^{13}$. $G^{14}$ is an oil hole through the sleeves $F^{12}$ and $G^{12}$. $G^{15}$ is a slot in the bottom of the nut $G^8$ to permit circulation of the oil throughout the entire length of the sleeve $F^{12}$.

H is a universal joint on the rear end of the stem $G^1$. $H^1$ is a hollow control rod mounted at one end on the universal joint H and rotatably mounted at the other in a split bearing $H^2$. The two parts of the split bearing are adapted to be clamped together against the enlargement $H^3$ on the shaft $H^1$ by means of a cam lever $H^4$ having a cam shoulder $H^5$ pivoted at one end on the lower portion of the bearing, the shoulder being adapted to engage the cam surface $H^6$. The block $H^2$ is pivotally mounted as indicated on a plug $H^{50}$ adapted to be screw threaded into the side of the boiler $H^{60}$. $H^7$ is an operating hand wheel whereby the operator may manipulate the reversing mechanism.

I is a slot through the shaft $H^1$ adjacent its lower end. $I^1$ is a hollow annular carriage slidable upon shaft $H^1$. $I^2$ is a connecting link pivoted on said carriage at one end and at the other end on the sleeve $F^{12}$. $I^3$ is an indicator rod located on the control rod $H^1$. $I^4$ is a cross piece slidable in the slot I engaging the interior of the carriage $I^1$ mounted at the lower end of the indicator $I^3$. $I^5$ is a scale engraved on the end of the indicator arm, where it passes through the sleeve or nut $I^6$ marked as indicated to show the position of the reversing gear.

A modified form of my device is illustrated in Figs. 12 and 13, where, instead of having a ponderous arm projecting from the steam chest cover, I employ a steam chest cover H held in position on the steam chest in the usual manner. Located in the center of this cover H is a stuffing box $H^1$ containing packing $H^2$, surrounding the valve rod $H^3$. $H^4$ is a gland mounted in the stuffing box $H^1$ and held rigidly in position therein by means of the bolts $H^5$ which engage, of course, the flange $H^6$ on the stuffing box. $H^7$ is a rod outwardly projecting from the gland parallel with the valve stem and forming a guide for the crosshead $H^8$ which is apertured to engage or slide along the rod and rigidly mounted on the valve stem, which cross head of course, carries the pins $H^9$ which engage the link $H^{10}$ in the usual manner.

In the modified form shown in Figs. 14 and 15, I apply a portion of my reversing mechanism to the ordinary well-known type of Walschaert valve gear wherein L is the steam cylinder, $L^1$ the valve steam chest, $L^2$ the engine crosshead, $L^3$ the valve stem crosshead, $L^4$ the combination lever, $L^5$ a driving link connection therefrom to the arm $L^6$ on the crosshead $L^2$, $L^7$ a radius rod leading from one end of the combination lever to the link block $L^8$ in the reversing link $L^9$. $L^{10}$ is the driving arm on the reversing link pivoted at one end to the eccentric rod $L^{11}$.

M is a bracket upon which are pivotally mounted the reversing link $L^9$ and the reversing shaft $M^1$. The reversing shaft $M^1$ carries a lever $M^2$ pivoted on a block $M^3$, which block is slidable on the extension $M^4$ on the radius rod $L^7$. $M^5$ is a controlling lever on the reversing shaft $M^1$, $M^6$ a link leading therefrom and pivotally attached at its other end to the lug $M^7$ in the block $M^8$ screw-threaded in the end of the reversing sleeve $M^9$, which sleeve is adapted to be moved back and forth in the same manner as previously indicated in my preferred form by means of a screw $M^{10}$.

It will be evident that while I have shown in my drawings an operative device, still many changes might be made in the size, shape and arrangement of parts without departing materially from the spirit of my invention, and I wish, therefore, that my drawings be considered as in a sense diagrammatic.

The use and operation of my invention are as follows:—

It must first be understood that the valve movement for the two engines of the locomotive is obtained entirely from the piston movement of those two engines. The peculiarities of lap and lead in valve travel are, of course, well known and need no particular discussion at this time. Suffice it to say, that it is necessary to have two separate sources of power in order to provide the proper lap and lead and valve travel movement. In my arrangement, I make the reciprocation of the piston of each engine give the lap and lead movement for its own valve and at the same time give the valve travel movement for the valve of the other engine. Thus it is necessary to connect across between the two engines by any suitable means such as the two rock shafts shown.

Referring first to Fig. 1, when the piston reciprocates it will cause the reversing link to rock back and forth. The rocking of this link will cause the floating lap and lead lever to reciprocate, and assuming for the instant that the lever which supports the floating lap and lead lever is fixed, the only movement given to the engine valve on the right hand side will be the lap and lead movement caused by the rocking of the lap and lead lever. This movement is a very slight movement, as may be seen by the arrangement of the lever. We have assumed that the lever on the interlocking shaft upon which the lap and lead lever on the right hand side is mounted is fixed. This is because in the view as shown the radius bar does not reciprocate.

It does not reciprocate because the block upon which it is pivoted is, as shown, located at the center of the reversing lever, and thus the movement of the reversing link has no effect. It will, of course, be understood that when the block is at the center of one lever, the similar block is at the center of the other, and that the operation of the other engine is the same so that in the position shown in Fig. 1, the engine will run in either direction according to which direction it happens to have started, but its power will be slight, on account of the steam port opening being equal only to the lead, its maximum opening occurring at each dead center of the driving wheels. Immediately the wheel center is passed, the steam opening commences to close and cut off access before there is an appreciable movement of the piston, but the clearance space between the piston and valve will contain steam at high pressure, and its expansion will cause sufficient power to operate the engine.

Referring now to Fig. 3, we see that the reversing gear has been manipulated to bring the block near the upper end of the slot in the reversing link. The engine on the other side will similarly have the block near the bottom of the reversing link, as it will be noted that the reversing mechanism is such that when one bar goes up the other goes down. In double cylinder engines the main rod connection to the driving wheels is in effect a crank on each end of the driving axle, one crank 90° in advance of the other. Consequently one engine, usually the right engine may be said to lead the other 90°. If, however, we should consider the left hand engine as leading its lead would then be 270° instead of 90°. For this reason a valve deriving its entire movement from the reciprocation of the pistons must be arranged for valve travel producing mechanism direct on one side and indirect on the other. This is the reason for causing one radius bar to go up when the other goes down. Instead of being a disadvantage, this is a decided advantage inasmuch as it causes a "balanced" gear and materially lessens its difficulty to manipulate. Now with the engine moving the reciprocation of the crosshead will result in a rocking of the reversing lever and this rocking of the reversing lever will result in a rocking of the floating lap and lead lever and thus the valve on the right hand side will be given this lap and lead movement owing to the rocking of the right hand reversing lever and the same will be true of the valve on the left hand side owing to the rocking of the left hand reversing lever. But now that the two blocks are moved away from the center of the reversing levers, the radius bars will commence to reciprocate and the reciprocation of the radius bar will tend to rock the two interlaced shafts which extend across the engine. As shown in Fig. 3, the rocking of the radius bar on the right hand side will result in a rocking of the lever which supports the lap and lead lever on the other side, that is to say, for the left hand engine, and the left hand piston thus takes its lap and lead movement from its own piston but gets its valve travel from the reciprocation of the piston of the engine on the other side.

The reversing shaft it will be noted is made up of two parts, one short, the other long. Each of them has at each end a lever. The outside levers when rocked tend to raise or lower, as the case may be, the radius bar, because these levers are pivoted on the block which is slidable in the slot in the radius bar. The slot being longer than the block permits the arms to rock without binding and also permits the radius bar to reciprocate without interference from these arms. The two shorter arms adjacent the inner ends of the two parts of the rock shaft project one above and one below the plane of the longer arms and are connected to the reversing housing so that when this reversing housing is moved toward the rock shaft by means of the toggle effect, the short arms will be separated and one arm will be raised and the other lowered, and when the reversing housing is moved away from the rock shaft the opposite takes place so that when one radius bar is raised the other is lowered. Thus there is always mechanical balance and the load upon the reversing mechanism is slight.

It will be noted that the reversing mechanism is mounted upon the valve mechanism frame so that when expansion takes place in the boiler no effect will be had in the reversing mechanism, because the only thing that effects the reversing mechanism is the rotation of the screw in the reversing housing, which since that screw is fixed in position on the gear frame moves the reversing sleeve back and forth. Any expansion in the engine resulting in a change in the length of the rod or control leading up to the engine cab can have no effect because the end of that rod is free to slide back and forth in the support on the boiler.

In order that the engineer may know just where his reversing mechanism is placed, that is to say, whether his engine is set for reverse or for forward or in a particular cutoff, an indicator must be provided. This indicator takes the form of a graduated or marked rod which projects out from the end of the controlling shaft through the hand wheel. This shaft or rod moves back and forth in response to the movement of the reversing sleeve because of the connection through the link from the reversing sleeve to the carriage slidable on that hollow shaft. This carriage, of course, is located on the shaft where the shaft is slotted and being hollow the pin on each slide through the slot from the indicator bar is engaged by the carriage and moved back and forth by it so as to give the operator at all times a fixed indication of where his engine is.

The block in the reversing link is integral with the pins projecting from it and these pins are themselves rotatably mounted in the bearings in the forked ends of the radius bar. These bearings can be made as long as necessary without effect upon the weight of the block itself or the weight of the reversing link.

The bearing for the upper end of the reverse control rod is, as it will be noted, screw-threaded in the wall of the firebox or boiler and the rod is slidable and rotatable in that bearing. In order to prevent rotation of the rod after the engine has been set at a certain point, the quick active cam lever device is applied to draw together the two split parts of the bearing and lock the rod against rotation. The reversing screw, it will be noted, is inclosed within a dust-proof oil container or receptacle so that it is not exposed to wear and abrasion by the grit and dirt of the road, and as the screw moves back and forth in the nut therein contained, it is lubricated by the oil contained within the housing.

In assembling and applying my device to any particular type of engine, the gear frame will be first put in position attached at its forward end to the cross-frame in the rear of the cylinder and supported at its rear ends by the extension L member. This extension L member will change for different types of engines. It must be long enough so that the tie piece across the engine frame between the two L members which rests upon the saddle upon the locomotive frame is located between an adjacent pair of drivers. These L members are, of course, made out of ordinary stock material and may be cut off to suit so that no matter how big or how small the wheel or no matter how it is spaced or what the room is the gear frame can always be supported from the locomotive frame without difficulty, the only variable parts in this connection being the L members and the tie members cutting across between them. The reversing links will, of course, then be mounted in the gear frame, and since the position of the reversing link with respect to the crosshead of the engine is always fixed for each particular engine, it will then be necessary only to provide a link or suitable link extending from the crosshead wrist pin or other suitable point to the adjustable downwardly extending arm which is at that time rigidly mounted on the reversing link. This arm, of course, would change both in length and in inclination to the reversing link depending upon the side and arrangement of the engine. The two interlocking rock shafts will then be put in position supported one at either end as indicated at the other and one at either end on the gear frame. The two parallel levers at either end project upwardly. The lap and lead levers are then positioned, being pivoted each upon the outer lock levers and the upper ends of these lap and lead levers will then be connected by the reach rods to the upper ends of the reversing lever respectively. These parts, that is to say, the lap and lead lever, the reach rod and the rocking shafts with their levers are, of course, always fixed in size and do not vary for different types of engines. The radius bars are then put in place pivoted at one end on the inside upwardly projecting lever and at the other end on the block which is then assembled and put in place with the arms on either end in pivotal engagement with one of the blocks slidable in the radius bar so that rotation of the reversing shaft will control the vertical position of the radius bar. The reversing sleeve is then put in position slidable in the bearings of the gear frame and coupled up by means of the toggle link connections with the short reversing arms. The reversing screw is then put in mesh with the reversing sleeve and anchored by means of the ball bearings in the bearing as shown. All these parts are, of course, fixed and standard for any ordinary range and size or shape. Then the valve stem and crosshead is connected by means of the variable link to the lower end of the lap and lead lever and this link changes for different type and sizes of engine, but this change has no effect upon the operation of the device. The same is true of the levers controlling the rod which extends back to the cap. It may be of any suitable length so long as it reaches from the universal on the end of the reversing screw to the cab where the engineer can operate it. The carriage free to slide on the rod is, of course, fixed and standard and the distance between it and the reversing sleeve is fixed so that the link connecting them is always the same length. However, for different length engines, different length of indicating rod must be used and this can, of course, be cut off in lengths to suit every standard stock subsequently marked as desired either when the engine is manufactured or later by the operator.

By the expression working parts, I mean those parts of the valve and reversing gear which coöperate to give the desired motion to the valve. By driving parts I mean such as impart to the working parts their motion. By driven parts I mean such as receive motion from the working parts. By the term actuating as applied to the working parts, I mean to include the working parts with the reversing mechanism excluded. By the reversing mechanism, I mean those of the working parts which have to do with reversing the valve movement.

By the expression floating lever, I mean to indicate such a lever as is not limited in its motion at any particular point to a particular point or line of movement by anything other than the parts which contribute to its movement or transmit motion from it to some other part.

By the term flexible as applied to the connecting parts, I refer to connections capable of movement with reference to their several parts, as, for example, where they are pivotally connected.

The foot of the reversing link is driven from the crosshead. It is the crosshead movement which furnishes the power to oscillate the link. Preferably I take that power from the crosshead by connecting the reversing link directly to the crosshead, but it is obvious that all that is necessary is that it be connected to some part of the system driven by the crosshead since the piston, the crosshead, the main rod and the crank pinion all operate in synchronism and it would make no difference from what specific part of this synchronized crosshead system the power for driving the link is taken.

By the expression "control" we refer to the hand wheel whereby the operator controls the reversing mechanism. The rod from such control to the transmission device I call a connection rod or a connection between the control and the reversing mechanism.

The transmission device is that apparatus in the unitary structure art directly associated with the reversing mechanism whereby the latter can be controlled. It is partially designed to operate without reference to any changes for example in effecting length in the rod or connection. By the expression "group" or "integral group" I refer to that association of the several parts which brings them in the unitary or group relation whereby they may in such group be set up and then applied to any given locomotive or engine. By the expression "permanently" as I have employed it with regard particularly to connections I desire to distinguish between adjustable devices and devices which are permanent in their relation.

I wish it understood that these several features could be greatly changed without departing from the spirit of my invention thus for example a transmission mechanism might be very different from the specified mechanism shown and yet comply with my invention. My invention here consists in details the arrangement of these details the grouping of the several parts and the grouping of all the parts and in the frame intermediate the group and the engine frame and in the several combinations of these said parts together with the cross rods and connections or such of them as are necessary in any given group as herein before fully described and illustrated.

I claim:

1. A steam engine valve gear comprising valve actuating and reversing devices and their supporting and connecting parts, arranged in a permanent, unitary group, removably mounted on the engine in combination with valve, engine and control connections, adapted to be varied to fit the group to engines of varying designs.

2. A steam engine valve gear comprising valve actuating and reversing devices and their supporting and connecting parts, arranged in a permanent, unitary group, removably mounted on the engine in combination with valve, engine and control connections, adapted to be varied to fit the group of engines of varying designs and an intermediate frame between the group and the engine frame.

3. A steam engine valve gear comprising valve actuating and reversing devices and their supporting and connecting parts, arranged in a permanent, unitary group removably mounted on the engine in combination with valve, engine and control connections, consisting each of a link pivotally connected at one end with the working parts and at the other with the engine, valve and control, said connections adapted to be varied to fit the group to engines of varying designs.

4. A steam engine valve gear comprising valve actuating and reversing devices and their supporting and connecting parts, arranged in two permanent, unitary groups mounted one on each side of the engine in combination with valve, engine and control connections adapted to be varied to fit the group to engines of varying designs, and two cross-shafts and connections whereby each shaft is connected to the engine at one side and to the valve at the other, said shafts having the same rotational axis.

5. A steam engine valve gear comprising valve actuating and reversing devices and their supporting and connecting parts, arranged in two permanent, unitary groups one on each side of the engine, removably mounted on the engine in combination with valve, engine and control, connections adapted to fit the groups to engines of varied design and frames intermediate each group and the engine and two cross-shafts mounted on said frames and connections whereby each is connected to the engine at one end and to the valve at the other.

6. A steam engine valve gear comprising valve actuating and reversing devices, and their supporting and connecting parts, arranged in permanent, unitary groups, one on each side of the engine, removably mounted on the engine in combination with valve, engine and control connections adapted to be varied to fit engines of varying design and two cross-shafts and connections whereby each shaft is connected to the engine at one end and to the valve at the other, said shafts having the same rotational axis and a cross reverse mechanism shaft mounted on and supported integral with said groups.

7. A steam engine valve gear comprising valve actuating and reversing devices and their supporting and connecting parts, arranged in two permanent, unitary groups one on each side of the engine, removably mounted on the engine, in combination with valve, engine and control connections adapted to fit the groups to engines of varying design and frames intermediate each group and the engine and two cross-shafts mounted on said frames and connections whereby each is connected to the engine at one end and to the valve at the other, and a cross reverse mechanism shaft mounted on or supported integral with said groups.

8. In a steam engine valve gear, the combination of valve operating parts with reversing parts grouped as a unit on the engine, with power transmitting connections to the driving and driven parts, and controlling means for the reversing part comprising a rotatable operating shaft and a universal joint therein.

9. A steam engine valve gear comprising valve actuating and reversing devices and their supporting and connecting parts and a valve reversing transmission device arranged in a permanent, unitary group, removably mounted on the engine in combination with valve, engine and control connections adapted to be varied to fit the group to engines of varying design.

10. A steam engine valve gear comprising valve actuating and reversing devices, connections to the engine, the valve and the control and intermediate the control connection and the valve reversing mechanism a transmission device having a rotating part anchored against longitudinal movement.

11. A steam engine valve gear comprising valve actuating and reversing devices, connections to the engine, the valve and the control, a transmission device having a rotating part anchored against longitudinal movement and a rod connected at one end to the control and at the other end to the transmission device.

12. A steam engine valve gear comprising valve actuating and reversing devices, connections to the engine, the valve and the control, a transmission device having a rotating part anchored against longitudinal movement, a rod, a support in which the rod is slidably mounted at one end and a control mounted on the rod at such end, said rod connected at its other end to the transmission device.

13. A steam engine reversing gear in combination with valve actuating devices and a transmission device, the parts grouped in a permanent, operative connected relation and mounted on the engine and a control connected with such transmission device.

14. A steam engine reversing gear in combination with valve actuating devices and a transmission device, the parts grouped in a permanent, operative connected relation and mounted on the engine and a control connected with such transmission device, said transmitting device containing a rotatable part anchored against longitudinal movement.

15. A steam engine reversing gear in combination with valve actuating devices and a transmission device the parts grouped in a permanent, operating connected relation and mounted on the engine and a control connected with such transmission device, said transmitting device containing a rotatable part anchored against longitudinal movement, and a rod connected at one end with the control and at the other end with the transmission device.

16. A steam engine valve gear comprising valve actuating parts and reversing devices and their supporting and connecting parts, arranged in two permanent unitary groups mounted one on each side of the engine in combination with valve, engine and control connections adapted to be varied to fit the group to engines of varying design and cross connections from the devices of one group to those of the other.

17. In a steam engine valve gear a reversing link and operating lever both mounted on a frame, and a connection between the lever and the valve stem, the link, lever and connection being arranged in the order named, in combination with suitable connecting and supporting parts for the operating parts of the gear and for the supporting frame.

18. A valve gear for multicylinder engines comprising a reversing link for each cylinder and means for oscillating it, a floating lap and lead lever for each cylinder and a fixed connection from one end of said link to one end of said lever, a connection from said lever to said valve, and adjustable means responsive to the movement of the piston in one cylinder for oscillating the pivotal point of the lap and lead lever for another cylinder.

19. A valve gear for multicylinder engines comprising a reversing link for each cylinder and means for oscillating it, a floating lap and lead lever for each cylinder and a fixed connection from one end of said link to one end of said lever, a link connection from said lever to said valve and adjustable means responsive to the movement of the piston in one cylinder for oscillating the pivotal point of the lap and lead lever for another cylinder.

20. A valve gear for multicylinder engines comprising a reversing link for each cylinder and means for oscillating it, a floating lap and lead lever for each cylinder and connection therefrom to the valve and to the reversing lever, rock shafts having rocker arms thereon, each lap and lead lever being pivotally mounted on one of the arms of one of said shafts, radius bars pivotally mounted at one end on the other arm of each of said shafts and at the other end on one of the reversing links.

21. A valve gear for multi-cylinder engines comprising a reversing link for each cylinder and means for oscillating it, a floating lap and lead lever for each cylinder and a connection therefrom to the valve and to the reversing lever, rock shafts having rocker arms thereon, each lap and lead lever being pivotally mounted on one of the arms of each of said shafts, and a radius bar pivotally mounted at one end on the other arm of each of said shafts and at its other end on one of the reversing links, a fixed connection from one end of each reversing link to one of the floating lap and lead levers.

22. In a steam engine valve gear a floating lap and lead lever, a link connection therefrom to the valve and means for rocking the lever to give the valve lap and lead movement and means for displacing its axis of rotation to give the valve travel, said means comprising a reversing lever and a link from the lap and lead lever to the reversing lever.

23. In a steam engine valve gear a floating lap and lead lever, a link connection therefrom to the valve and means for rocking the lever to give the valve lap and lead movement and means responsive to the lever for displacing its axis of rotation to give the valve travel, said means comprising a reversing lever and a link from the lap and lead lever to the reversing lever.

24. In a valve gear for multicylinder engines, a floating lap and lead lever for each cylinder, a link connection therefrom to the valve and means responsive to the operation of each cylinder for rocking the lever therefor to give the valve lap and lead movement and means responsive to the operation of the other cylinder for bodily displacing the axis of rotation of the lever to give the valve travel, said means comprising a reversing lever and a link from the lap and lead lever to the reversing lever.

25. A valve gear for multi-cylinder engines comprising a reversing link for each cylinder and means for oscillating it, a floating lap and lead lever for each cylinder and connections therefrom to the valve and to the reversing lever, rock shafts having rocker arms thereon, each lap and lead lever being pivotally mounted on one of the arms of one of said shafts.

26. A steam engine valve gear comprising valve actuating and reversing devices and their supporting and connecting parts arranged in a permanent unitary group removably mounted on the engine in combination with valve engine and control connections adapted to be varied to fit the group to engines of varying design, said valve gear including a floating lever with means for rocking such lever to give the lap and lead movement and for moving its axis of rotation to give the valve travel.

27. A steam engine valve gear comprising valve actuating and reversing devices and their supporting and connecting parts arranged in a permanent unitary group removably mounted on the engine in combination with valve engine and control connections adapted to be varied to fit the group to engines of varying design, said valve gear including a floating lever with means for rocking such lever to give the lap and lead movement and for moving its axis of rotation to give the valve travel and a frame for such unitary structure intermediate the same and the engine frame.

28. In a valve gear for steam engines and the like the combination of valve actuating devices and a reversing lever with a rock shaft, rock arms thereon, means for rocking said shaft and connections between said reversing lever and said rock shaft arms.

29. In a valve gear for steam engines and the like the combination of valve actuating devices and a reversing lever with a rock shaft, rock arms thereon, means for rocking said shaft and connections between said reversing lever and said rock shaft arms, and a floating lever through which the connection from the reversing lever to one of the rock arms is made.

30. In an engine valve gear a reverse link and means for oscillating it, a floating lap and lead lever and a connection from one end of said reverse link to one end of said lap and lead lever.

31. A valve gear for two cylinder engines comprising two reversing links, means responsive to the operation of each cylinder for separately oscillating one of said links, a pair of interwoven rock shafts having rock arms on either end, each of said reversing links being slotted, blocks slidable in said slots, radius bars pivoted each at one end on one of said blocks and at the other end on one of the rock arms on each of said rock shafts, a floating lap and lead lever pivoted on each of the other rock arms on said shafts, a reach rod pivoted on one end of each of said lap and lead levers and at the other end of each of said reverse links and a link connection from each of said lap and lead levers to the valve for each cylinder.

32. In a multi-cylinder engine a pair of valve gear frames removably mounted adjacent each cylinder, a valve gear for the two cylinders mounted on and between said frames, a link connection between said valve gears and the engine valves and a link connections between said valve gears and the engines, both of said link connections being variables without reference to the valve gear itself, a moving and driving connection across between the two frames adjacent one end alone, reversing links mounted for oscillation in said frames removed from said cross connection, the driving connection being interposed between said reversing links and the engine, floating lap and lead levers mounted on said cross connection, the connections to the valves being interposed between the valves and such levers, driving connections between said reversing links and said cross connections, one of said driving connections being fixed in position, the other being variable.

33. A valve gear for multicylinder engines, comprising a plurality of slotted segmental reversing links, means for oscillating each link in direct response to reciprocation of a piston in one of said cylinders, a plurality of interlacing rock shafts, having each shaft a plurality of rocker arms thereon, a plurality of floating lap and lead levers connected one to each engine valve and mounted on one of the arms of each rock shaft, a fixed connection between each reversing link to one end of each lap and lead lever, and adjustable connection between each reversing link to the other, lap and lead lever, and means for varying said adjustable connection.

34. A combination of a railroad locomotive and a fixed valve gear frame removably mounted thereon, a reversing lever and rock shafts mounted on said frame, a lap and lead lever mounted on one of said rock shafts, fixed connections interposed between said lap and lead lever and reversing link, together with adjustable means for mounting the whole on the engine, and an adjustable connection from said lap and lead lever to the valve and from said reversing link to the engine.

35. A valve gear for two cylinder engines comprising a pair of separate removable gear frames, a slotted segmental reversing link pivotally mounted on each frame, and a connection between each link and one of the engines, a pair of interlacing rock shafts, journaled to rotate about a common axis, rock arms thereupon, a floating lap and lead lever pivotally mounted upon one of said rock arms on each shaft and fixed link connections from said reversing link to one end of each of said floating levers, a connection between the other end and the valve stem and an adjustable connection between each reversing link and the remaining rock arm on each rock shaft.

36. A combination with a two cylinder engine of a valve gear frame for each engine, a reversing link pivoted on each of said frames and means for rocking it responsive to the reciprocation of the engine, a floating lap and lead lever pivotally mounted and a connection from said reversing link to one end thereof, a connection between the other end thereof and the valve stem and adjustable means responsive to the rocking of the other reversing lever for rocking the pivotal point of said lap and lead lever.

37. A valve gear for two cylinder engines comprising a reversing link for each cylinder and means for oscillating it in response to the movement of the piston, a floating lap and lead lever for each cylinder, a connection from one end thereof to the valve, and connection from the other end thereof to the end of the reversing lever and adjustable means responsive to the reciprocation of the other reversing lever for oscillating the pivotal point of said lap and lead lever.

38. A valve gear for multicylinder engines comprising a plurality of reversing links, means for separately oscillating each of them in response to the reciprocation of one of the engine pistons, a plurality of interwoven rock shafts mounted for effective oscillation about a common axis and having each a plurality of rocker arms thereon, a floating lap and lead lever for each cylinder rotatably mounted on one of said rocker arms, a connection from one end thereof to the valve from the other end thereof to one of the reversing links, and an adjustable connection from another rocker arm on each shaft to a reversing link other than the one directly connected to the lap and lead lever on that shaft.

39. In a valve gear for a plurality of engines, a reciprocating piston and its distribution valve operatively united by a reversing link permanently connected to said piston, a floating lever permanently connected to said valve; and a permanent connection between said lever and link said lever and link being approximately parallel to each other during operation in combination with another piston and valve identically united, both reversing links concentrically mounted and each adjustably connected to the other permanently connected valve.

40. In a valve gear for a plurality of engines, a reciprocating piston and its distribution valve operatively united by a reversing link permanently connected to said piston, a floating lever permanently connected to said valve, and a connecting link between said lever and link in combination with another piston and valve identically united, both reversing links concentrically mounted and each adjustably connected to the other permanently connected valve, the adjustable connections being wholly located between the reversing links and distribution valves.

41. In a valve gear for a plurality of engines, a reciprocating piston and its distribution valve operatively united by a reversing link permanently connected to said piston, a floating lever permanently connected to said valve and a connecting link between said lever and link in combination with another piston and valve identically united, both reversing links concentrically mounted and each adjustably connected to the other permanently connected valve, the permanent and adjustable connections being wholly located between the reversing links and distribution valves.

42. In a valve gear for a plurality of engines, reciprocating pistons and distribution valves operatively connected, said valves each permanently and adjustably connected to reversing links, reverse shafts concentrically mounted between said valves and links, operative connections between said reverse shafts and said adjustable connections.

43. In a valve gear for a plurality of engines, reciprocating pistons and distribution valves operatively connected, said valves each permanently and adjustably connected to reversing links, rock shafts concentrically mounted between said valves and links, adjustable connections between said rock shafts and said links.

44. In a valve gear for a plurality of engines, reciprocating pistons and distribution valves operatively connected, transverse rock shafts concentrically mounted between said valves and reversing links, adjustable connections between said rock shafts and said valves.

45. In a valve gear for a plurality of engines, reciprocating pistons and distribution valves operatively connected including reversing links, reverse shafts and rock shafts concentrically mounted in three unit groups, said reverse shaft group located between said link and said rock shaft group.

46. In a steam engine a valve rod crosshead having integral trunnions outwardly projecting therefrom, valve actuating means and a flexible connection interposed between said trunnions and said means.

47. In a steam engine a valve rod cross head having integral trunnions outwardly projecting therefrom, valve actuating means and a flexible connection interposed between said trunnions and said means, the valve rod adjustably secured on the valve stem.

48. In a steam engine a valve rod cross head, a guide therefor, a floating lever, and connecting links interposed between said lever and said crosshead.

49. In a steam engine a steam chest and cover therefor, a guide projecting therefrom, a valve stem crosshead slidable along said guide, a floating lever, and connecting links interposed between said valve stem and said floating lever.

50. In a valve gear for a plurality of engines, comprising reciprocating pistons and distribution valves operatively connected, the combination of rock shafts concentrically mounted, lap and lead members supported thereon, reversing links and adjustable connections between said rocks shafts and reversing links.

51. In a valve gear for a plurality of engines, comprising reciprocating pistons and distribution valves operatively connected, the combination of rock shafts concentrically mounted, lap and lead members supported thereon, reversing links and adjustable connections between said rock shafts and reversing links, and permanent connections between said lap and lead members and reversing links.

52. In a valve gear for a plurality of engines, comprising reciprocating pistons and distribution valves operatively connected, the combination of rock shafts concentrically mounted, lap and lead members supported thereon, reversing links, and permanent connections between said lap and lead members and reversing links.

53. In a valve gear for a plurality of engines, comprising reciprocating pistons and distribution valves operatively connected, the combination of rock shafts concentrically mounted, reversing links adjustably connected thereto, floating levers supported by said rock shafts, permanent connection between each floating lever and the reversing link to which its supporting rock shaft is unconnected.

54. In a valve gear for double cylinder engines comprising reciprocating pistons and distribution valves operatively connected, the combination of two rock shafts concentrically mounted, two reversing links adjustably connected, one to each rock shaft, a floating lever supported by each rock shaft, each floating lever permanently connected to a distribution valve and to the reversing link to which its supporting rock shaft is unconnected.

55. In a valve gear for double cylinder engines, comprising reciprocating pistons and distribution valves operatively connected, the combination of rock shafts concentrically mounted, reversing links adjustably connected to said rock shafts, floating levers supported by said rock shafts, each reversing link permanently connected to the floating lever on its side of the engine for producing approximately parallel motion.

56. In a valve gear for steam engines the combination with the cross head of the cylinder of a wrist pin thereon, a main rod pivoted to the said wrist pin, a reversing link mounted on the locomotive frame and having a downwardly projecting arm and a connecting link pivoted at one end to said arm and at the other on the said wrist pin.

57. A valve gear for multi-cylinder engines comprising reciprocating pistons and distribution valves operatively connected in unit groups, each group having a radius bar extending rearwardly from its fulcrum and reversing link adjustably connected thereto and floating lever permanently connected to said link.

58. A valve gear for multi-cylinder engines comprising reciprocating pistons and distribution valves operatively connected in unitary groups each group having a radius bar extending rearwardly from its fulcrum and a reversing link adjustably connected thereto, and a reciprocating cross head directly connected to said link.

59. A valve gear for multi-cylinder engines comprising reciprocating pistons and distribution valves operatively connected in unitary groups, each group having a radius bar extending rearwardly from its fulcrum and reversing link adjustably connected thereto, and floating lever and reciprocating cross head permanently connected to said link.

60. A valve gear for multi-cylinder engines comprising reciprocating pistons and distribution valves operatively connected in unit groups, each group having a radius bar extending rearwardly from its fulcrum and a reversing link adjustably connected thereto, and a reciprocating crosshead permanently connected to said link, all arranged for synchronous motion.

61. A valve gear for multi-cylinder engines comprising reciprocating pistons and distribution valves operatively connected in unit groups, each group having a radius bar extending rearwardly from its fulcrum and a reversing link adjustably connected thereto, and floating lever and reciprocating crosshead permanently connected to said link, all arranged for synchronous motion.

62. A valve gear for multi-cylinder engines comprising reciprocating pistons and distribution valves, reversing links concentrically mounted to oscillate upon a fixed fulcrum, and lap and lead levers permanently connected to said links at their upper ends, above their centers of oscillation.

63. A valve gear for multi-cylinder engines comprising reciprocating pistons and distribution valves, reversing links concentrically mounted to oscillate upon a fixed fulcrum, and lap and lead levers and reciprocating pistons permanently connected to said links at their upper ends, above their centers of oscillation.

64. In a steam engine valve gear a pair of rock shafts journaled for effective rotation about the common axis having rock arms projecting upwardly from either end of each shaft in combination with a floating lap and lead member pivotally mounted on one rock arm on each shaft.

65. The combination with a steam engine reversing gear of a reversing rock shaft and operating rocker arm thereon, a reversing screw located in a plane perpendicular to said shaft, means for holding it against longitudinal movement, a nut in engagement with said screw, a sleeve slidable there along, in which said nut is contained, a link interposed between said sleeve and said arm, and flexible operative connection from said screw to the locomotive cab.

66. In a steam engine valve gear in combination a pair of interwoven rock shafts journaled for effective rotation about a common axis, and rock arms projecting upwardly from either end of each shaft, and a floating lap and lead member pivotally mounted on one rock arm on each shaft.

67. In a steam engine valve gear in combination a pair of interwoven rock shafts journaled for effective rotation about a common axis, each shaft being exactly similar to the other, and journaled at one end on and projecting at the other end beyond its mate, rock arms projecting upwardly from either end of each shaft, and a floating lap and lead member pivotally mounted on one rock arm on each shaft.

68. In a steam engine valve gear in combination a pair of interwoven rock shafts journaled for effective rotation about a common axis, and rock arms projecting upwardly from either end of each shaft, and a floating lap and lead member pivotally mounted on one rock arm on each shaft, and driving means applied to each of the other rock shafts on said rock arms.

69. In a steam engine valve gear in combination a pair of interwoven rock shafts journaled for effective rotation about a common axis, each shaft being exactly similar to the other and journaled at one end on and projecting at the other end beyond its mate, rock arms projecting upwardly from either end of said shaft, a floating lap and lead member pivotally mounted on one rock arm on each shaft, and driving means applied to each of the other rock shafts on said rock arms.

70. In a steam engine valve gear in combination a pair of interwoven rock shafts journaled for effective rotation about a common axis, each shaft being exactly similar to the other and journaled at one end on and projecting at the other end beyond its mate, and rock arms projecting upwardly from either end of each shaft, a reverse link pivotally mounted in the same plane as one of said rock arms on each shaft, and adjustable connections interposed between it and said arm.

71. In a steam engine valve gear in combination a pair of interwoven rock shafts journaled for effective rotation about a common axis, and rock arms projecting upward from either end of each shaft, a reverse link pivotally mounted in the same plane as one of said rock arms on each shaft and adjustable connections interposed between it and said arm, and a floating lap and lead member pivotally mounted on each of the other rock arms on said shafts.

72. In a steam engine valve gear in combination a pair of interwoven rock shafts journaled for effective rotation about a common axis, each shaft being exactly similar to the other and journaled at one end on and projecting at the other end beyond its mate, and rock arms projecting upwardly from either end of each shaft, a reverse link pivotally mounted in the same plane as one of said rock arms on each shaft, and adjustable connections interposed between it and said arm, and a flexible lap and lead member pivotally mounted on each of the other rock arms on said shaft.

73. In a steam engine valve gear in combination a pair of interwoven rock shafts journaled for effective rotation about a common axis, and rock arms projecting upwardly from either end of each shaft, a reverse link pivotally mounted in the same plane as one of said rock arms on each shaft and adjustable connections interposed between it and said arm, a floating lap and lead member pivotally mounted on each of the other rock arms on said shaft, and a reach rod pivoted to one end on the floating lap and lead member at the other end on the reverse link.

74. In a steam engine valve gear in combination a pair of interwoven rock shafts journaled for effective rotation about a common axis, each shaft being exactly similar to the other and journaled at one end on and projecting at the other end beyond its mate and rock arms projecting upwardly from either end of each shaft, a reverse link pivotally mounted in the same plane as one of said rock arms on each shaft, adjustable connections interposed between it and said arm, a flexible lap and lead member pivotally mounted on each of the other rock arms on said shaft, and a reach rod pivoted to one end on the floating lap and lead member at the other end on the reverse link.

75. In a steam engine valve gear, the combination of reverse gear, a rotatable shaft for controlling the reversing movement, an indicator rod slidable within said shaft, an indicator collar upon said shaft in opposition to said indicator rod and means for moving said rod through said collar in response to the movement of the reversing mechanism, said means comprising a carriage on said shaft and connection therefrom to the reverse gear and a connection interposed between said rod and shaft independent of said carriage, rod or shaft, said connection comprising a pin on the lower end of the indicator rod, the shaft being slotted through the passage of said pin longitudinally there along, the carriage being grooved to engage said pin and move it longitudinally in unison with the carriage independently of its rotation.

76. In a steam engine valve gear, the combination of a valve rod, a packing gland therefor, a valve rod crosshead supporting the end of the valve rod, a valve rod crosshead guide integral with the gland.

77. In a steam engine valve gear, the combination of a valve rod, a packing gland therefor, a guide projecting outwardly from said gland parallel with the rod and a crosshead slidable on said guide and attached to the rod.

78. In a steam engine valve gear, the combination of a valve rod, a packing gland therefor, a crosshead on the rod, a guide projecting from the gland, the crosshead being apertured to engage the guide.

79. In a steam engine in combination, a valve rod, a packing gland therefor, a valve rod crosshead and a valve rod crosshead guide projecting from and supported by the gland.

80. In a steam engine valve gear in combination a floating lap and lead lever, a connection therefrom to the valve, standard driving and reversing means grouped as a unit in permanent operative relation therewith for rocking said lever to give the valve lap and lead movement and for bodily moving the pivotal point of said lever to give the valve travel.

81. In a valve gear for an engine the combination of a reverse lever with a floating lap and lead lever, the two arranged substantially parallel to and separated from each other with suitable connections between said levers and the engine, the valve and the control.

82. In a valve gear for a plurality of engines, a reciprocating piston and its distribution valve operatively united by a reversing link permanently connected to said piston, a floating lever permanently connected to said valve, and a permanent connection between said lever and link for producing approximately parallel motion in combination with another piston and valve identically united, both reversing links concentrically mounted and each adjustably connected to the other floating lever.

In testimony whereof, I affix my signature in the presence of two witnesses this 21st day of September 1914.

OTIS W. YOUNG.

Witnesses:
 GENEVA HIRTH,
 BESSIE S. RICE.